Jan. 31, 1956     H. HERLACH     2,732,767
FRICTION BRAKE FOR A GUN
Filed May 2, 1952
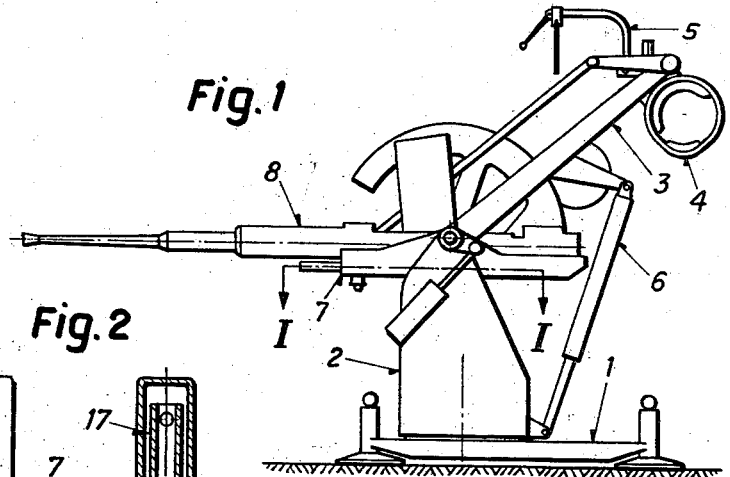
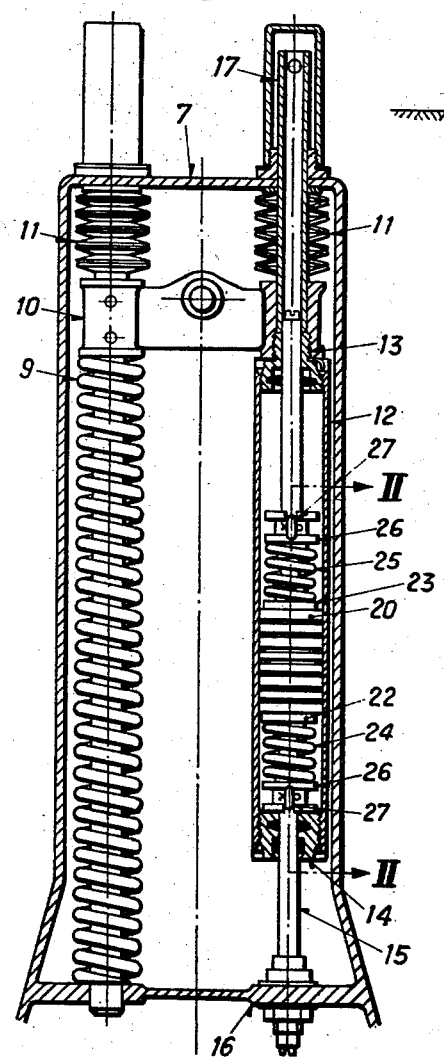
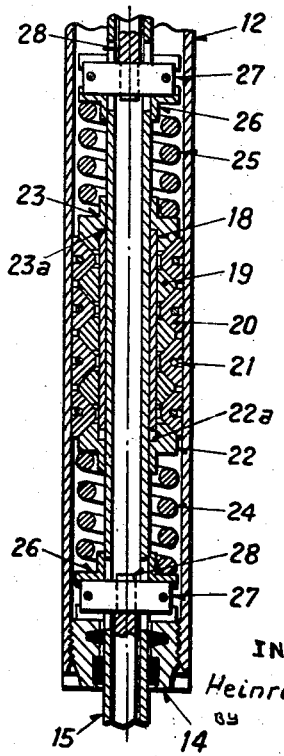
INVENTOR:
Heinrich Herlach
BY
ATTORNEYS

United States Patent Office 2,732,767
Patented Jan. 31, 1956

2,732,767

FRICTION BRAKE FOR A GUN

Heinrich Herlach, Zurich, Switzerland, assignor to Machine Tool Works Oerlikon, Administration Company, Zurich-Oerlikon, Switzerland, a Swiss company Application May 2, 1952, Serial No. 285,728

2 Claims. (Cl. 89—44)

The present invention relates to a friction brake for braking two parts movable linearly in relation to one another.

Friction brakes in which the braking action is produced by brake blocks of annular segmental shape bearing against a moving tube and pressed outwards by rings standing under axial pressure are known. By suitable design of such brakes it is possible to keep the braking force constant throughout the braking cycle.

The present invention, however, enables mutually differing constant braking forces of any magnitude to be obtained in the two directions.

The friction brake possesses a braking member consisting of rings with tapered lateral faces and having annular segmental brake blocks, likewise with tapered lateral faces, arranged therebetween, which brake blocks bear against the inside of a tube connected to one of the moving parts, and is characterized by the fact that the braking member is movably mounted between two compression rings each braced against a spring, on a support connected to the other moving part, the travel of the compression rings in the direction of the centre of the braking member being limited by stops on the support and the springs being braced against seatings secured to the support.

In the accompanying drawing an embodiment of the invention is depicted which serves to brake the movement of an automatic firearm in the cradle of the gun-carriage. In the drawing:

Figure 1 is a diagrammatic elevational view of a gun equipped with the friction brake according to the invention;

Figure 2 is a sectional view of the cradle of the gun-carriage along the line I—I in Figure 1; and Figure 3 is a sectional view of the frictional brake along the line II—II in Figure 2.

The gun shown diagrammatically in Figure 1 is provided with a tripod 1, a pivoting base 2, a movable training arm 3 with shoulder-rest 4, sights 5 and weight compensator 6, and is also provided with a cradle 7 in which the firearm 8 is movably mounted. As will be seen from Figure 2, the cradle 7 contains, arranged side by side, a recoil spring 9 and the friction brake, both of which are connected by the slide member 10 to the movable firearm 8. For the purpose of buffering the forward movement of the firearm, two packs of plate springs 11 are arranged in front of the slide member 10.

The friction brake is accommodated within the tube 12, which is connected to the slide member 10 by the intermediate member 13. At its rear end, the tube 12 is terminated by the sleeve 14. Inside the tube 12 is a hollow supporting tube 15 which is firmly connected to the cradle at 16 and is guided at its forward end in the bore of the intermediate member 13 and in the tubular guide 17 secured to the slide member 10.

The purpose of the said tubular guide 17 is to centre, at the forward end, the parts movable in the cradle and connected to the firearm. The sleeve 18 is secured to the supporting tube 15. The friction member mounted on the sleeve 18 comprises rings 19 with tapered lateral faces, between which the annular segmental brake blocks 20 are disposed. The brake blocks 20 have oblique lateral faces which bear against those of the rings 19. The brake blocks 20, which form a ring, are held together by a wire 21 when the braking member is removed from the tube 12. The brake blocks are made entirely of brake-block material.

The end brake blocks bear by their outer lateral faces against corresponding oblique faces of the compression rings 22 and 23, which are braced against the springs 24 and 25. The compression rings 22 and 23 are provided with shoulders 22a, 23a by which they can bear against the end faces of the sleeve 18. The springs 24, 25 are braced against spring seatings 26. The said seatings are held by keys 27 arranged for longitudinal displacement in slots in the supporting tube 15. The rods 28, against which the keys are braced, are screwed into the supporting tube 15. The springs 24, 25 are differently pretensioned, so that the braking member produces different braking forces in the two directions. The said braking forces are in each direction proportional to the force of the spring against which the braking member is pressed by the tube 12. Owing to the differing spring forces, one of the compression rings 22, 23 bears against the end face of the sleeve 18 even in the position of rest. In the embodiment shown, the spring 25 exerts greater force than does the spring 24, so that the compression ring 23 of the spring 25 bears with its shoulder 23a against the end face of the sleeve 18 right from the outset.

The following is the manner in which the inventive arrangement functions: In the position of rest, the brake blocks 20 are pressed outwards against the tube 12 by the spring-loaded compression rings 22, 23 and the rings 19. If now, on the recoil of the gun, the slide member 10 with the tube 12 is moved relatively to the cradle 7 with the supporting tube 15, the friction between the brake blocks 20 and the tube 12 causes the braking member to tend to move with the tube 12. This movement is only possible, however, when the frictional force between the brake blocks 20 and the tube 12 becomes greater than the force of the spring 24 counteracting that movement. As soon as this is the case, the braking member will move. Because the compression ring 23 of the spring 25 now bears against the end face of the sleeve 18, however, after a very small movement no further force will be exerted by the spring 25 on the friction member. As the friction member is now no longer compressed from both ends, the brake blocks 20 will relax and the frictional force immediately diminish. As soon as the frictional force becomes smaller than the force of the spring 24, the latter is again able to press the braking member against the compression ring 23 of the spring 25, so that the brake blocks 20 are again pressed against the tube 12, whereupon the cycle can be repeated. In this manner a constant braking force is achieved which is of exactly the same magnitude as the force of the spring 24.

When, as the barrel moves forward, the slide member 10 moves in the opposite direction in respect of the cradle 7, the friction member at first moves until the compression ring 22 of the spring 24 bears against the endface of the sleeve 18. Thereupon the operating cycle described above is repeated. As the spring 25 generates a greater force than does the spring 24, the braking force is correspondingly larger when the movement is in this direction.

The force of the springs 24, 25 can be modified as desired by adjusting the rods 28. The embodiment described is, of course, only one of various possibilities of putting the inventive idea into practice. In particular, the use of the friction brake in accordance with the invention is by no means restricted to gun-carriages and the like.

What I claim is:

1. In a friction brake, a tube having an inner cylindrical braking surface, a braking device having a plurality of segmental brake blocks located side by side in the longitudinal direction of the tube, said brake blocks being in frictional engagement with said braking surface and having inwardly directed wedge faces, and annular members having outwardly directed wedge faces and disposed between said brake blocks, the wedge faces of the annular members engaging the faces of the brake blocks, a supporting tube extending through the first-mentioned tube and movable axially relatively thereto, the second-mentioned tube carrying said annular members, two compression rings movably mounted upon the second-mentioned tube and having wedge faces, each of said compression rings engaging with its wedge faces the wedge faces of a brake block located upon a separate end of the braking device, two springs carried by the second-mentioned tube, means supporting opposite ends of said springs immovably relative to the second-mentioned tube, the other ends of said springs engaging axially separate compression rings, whereby said compression rings are subjected to pressures directed toward each other to press said brake blocks against said cylindrical braking surface, two stops mounted upon the second-mentioned tube between said compression rings, said stops being so located upon the second-mentioned tube that normally one compression ring by the action of said springs is pressed against one of the stops while the second compression ring is held at a distance from the second stop to produce greater tension in one spring than in the other spring.

2. In a gun having a reciprocating firearm, a slide member firmly connected with said firearm and having two bores formed therein, two rods extending through said bores in the direction of the reciprocating movement of the firearm a friction brake comprising a tube firmly connected with said slide member and enclosing the second-mentioned rod, a radially expansible braking device movably mounted in said tube and having two end surfaces extending transversely to the axis of said tube, said braking device further having an outer cylindrical surface for frictional engagement with the inner surface of said tube, whereby said braking device expands radially by axially directed pressure, and loading means engaging said end surfaces for axially loading them in opposite directions, said loading means comprising two spring elements of different strengths, the strongest of said spring elements pressing one of said end surfaces in the direction of the return movement of the firearm, a stop located upon the second-mentioned rod between said end surfaces, one of said end surfaces being pressed normally by the strongest of said spring elements against said stop, whereby during the return movement of the firearm the weaker spring element is actuated, and a second stop located upon the second-mentioned rod between said end surfaces, the other one of said end surfaces being pressed by the weaker of said spring elements against said second stop during the forward movement of the firearm, whereby a greater braking effect is exerted during the forward movement of the firearm than during the return movement.

References Cited in the file of this patent
UNITED STATES PATENTS

| 1,019,504 | McCombs | Mar. 5, 1912 |
| 2,229,390 | Roemer | Jan. 21, 1941 |
| 2,404,666 | Snyder | July 23, 1946 |
| 2,475,090 | Green et al. | July 5, 1949 |
| 2,481,006 | Dath | Sept. 6, 1949 |